United States Patent [19]

Ransom

[11] Patent Number: 5,037,162
[45] Date of Patent: Aug. 6, 1991

[54] TRUCK UTILITY TRAY

[76] Inventor: Jeffrey Ransom, 4009 Law Dr., Boise, Id. 83706

[21] Appl. No.: 605,389

[22] Filed: Oct. 30, 1990

[51] Int. Cl.⁵ ............................................. A47B 77/08
[52] U.S. Cl. .................................... 312/223; 312/236; 312/252; 224/42.44; 224/42.45 R
[58] Field of Search ....................... 312/223, 236, 252; 248/124, 310, 311.2; 108/44, 50, 23; 224/42.43, 42.44, 42.45 R

[56] References Cited

U.S. PATENT DOCUMENTS

| | | | |
|---|---|---|---|
| D. 199,462 | 10/1964 | Zack et al. | D58/13 |
| D. 248,056 | 5/1978 | Nepper | D87/1 R |
| D. 249,904 | 10/1978 | Monopoli | D87/1 R |
| D. 259,835 | 7/1981 | Page, Jr. | D3/40 |
| D. 264,525 | 5/1982 | Page, Jr. | D3/40 |
| D. 273,442 | 4/1984 | Schroeder | D3/40 |
| D. 293,163 | 12/1987 | Roth | D3/40 |
| D. 295,450 | 4/1988 | Iacovelli | D27/14 |
| 2,114,460 | 4/1938 | Ziegler | 108/23 X |
| 3,190,241 | 6/1965 | Rodgers et al. | 108/45 |
| 3,493,725 | 2/1970 | MacKay | 312/236 X |
| 3,606,112 | 9/1971 | Cheshier | 224/42.44 |
| 4,057,182 | 11/1977 | Kolkhorst et al. | 224/42.45 R |
| 4,174,669 | 11/1979 | Lalonde | 108/44 |
| 4,919,381 | 4/1990 | Buist | 248/311.2 X |
| 4,942,990 | 7/1990 | White | 248/310 X |
| 4,943,020 | 7/1990 | Beaucoup et al. | 248/124 |

Primary Examiner—Joseph Falk
Attorney, Agent, or Firm—Robert A. de Groot; Stephen A. Gratton

[57] ABSTRACT

A universally adjustable truck utility tray having heated cupholders, a low-intensity light, and a novel interlocking cup base that prevents tipping and spilling of beverages. The tray mounts on a vertically telescoping stand and also has horizontally adjustable and swiveling brackets to place the tray in a convenient reachable position adjacent a vehicle operator.

9 Claims, 3 Drawing Sheets

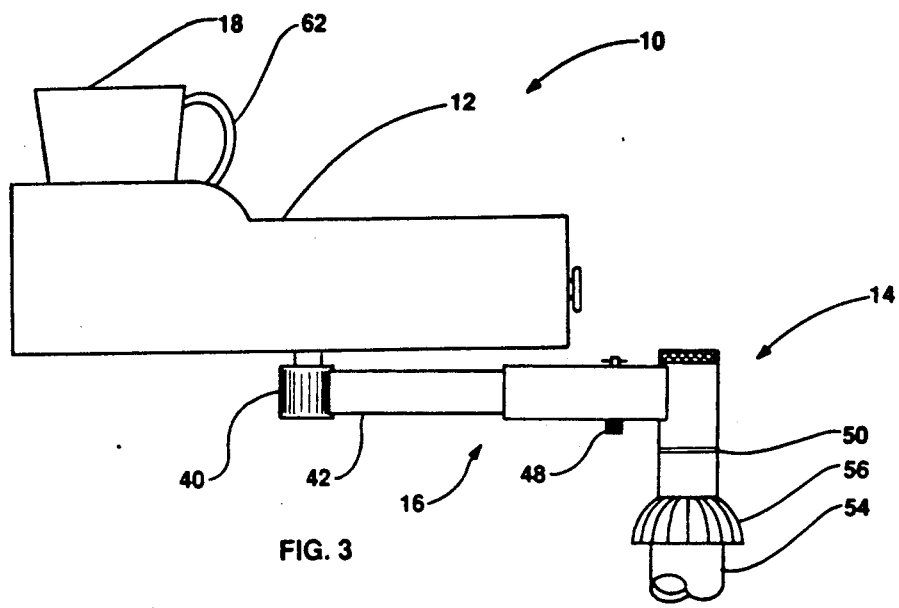
FIG. 3
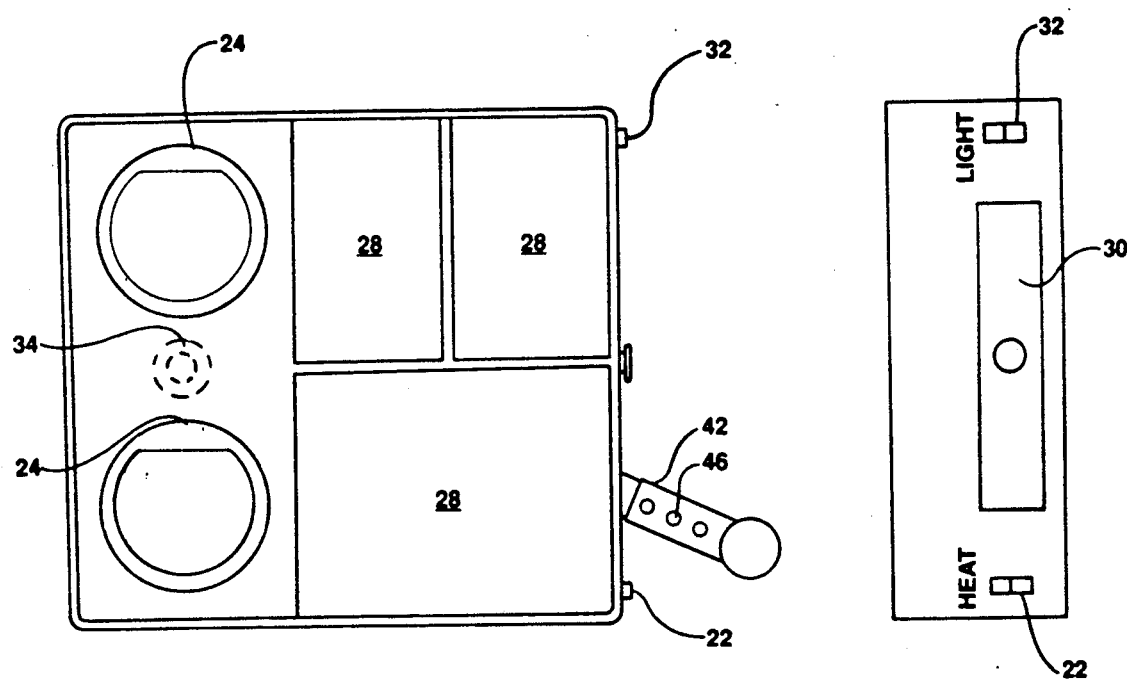
FIG. 2
FIG. 4

TRUCK UTILITY TRAY

FIELD OF THE INVENTION

This invention relates to an adjustable vehicle utility tray for placement in the cab within easy reach of a driver and having heaters, a light, and a cup interlocking means to prevent beverage spilling.

BACKGROUND OF THE INVENTION

There is a need in automobiles, trucks, and other vehicles for a tray device that can hold articles that provides the driver easy access. Some of these articles include coins, maps, papers, food, keys, beverages (hot and cold), and other personal belongings. It is important that these items are easily accessible in order to avoid having to reach or stretch for the articles while driving.

There are many design patents for console trays that set between car seats astride the propeller shaft or on a console. Examples are: U.S. Pat. Nos. D 248,056 issued May 30, 1978; D 249,904 issued Oct. 10, 1978; D 259,835 issued July 14, 1981; and D 264,525 issued May 25, 1982. Each of these devices generally set on the console and have compartments for cups, coins, papers, etc. None are firmly affixed as illustrated.

Additionally, there are other designs where the trays attach to the dash or under the dash, sometime being retractable. Examples are: U.S. Pat. Nos. D 273,442 issued Apr. 17, 1984; D 293,163 issued Dec. 15, 1987; and D 295,450 issued Apr. 26, 1988, which discloses a clock, compass, thermometer, and ash tray combination.

Examples of utility patents for dashboard, ashtray, and floor mount beverage holders include: U.S. Pat. No. 3,190,241 issued June 22, 1965, showing a hinged tray that can swing up for use or down for storage; U.S. Pat. No. 3,606,712 issued Sept. 20, 1971, disclosing a beverage and coin holder that attaches to and retracts under the dashboard; and U.S. Pat. No. 4,174,669 disclosing a cupholder and tray having a bracket that mounts to the dashboard or to the floor. None of the above provide for nigh lighting, warming of the beverage container, or three-dimensional adjustability.

SUMMARY OF THE INVENTION

In accordance with the present invention, an adjustable cup-warming, illuminated tray, and map drawer is provided.

The apparatus of the present invention generally stated consists of: a vertically telescoping stand; a horizontal adjustment means; and a tray having holders for one or more cups, storage compartments, a drawer, an internal light, and cup-warming heaters below the cupholders. In the preferred embodiment, the tray has two cupholders with an electric heater below each holder that is activated by an electric switch on the front of the tray. There is a second switch on the tray front that turns on an internal light located between the cupholders, such that low level illumination is provided by the light shining through the semitransparent plastic upper portion of the tray. The front of the tray also has a drawer for maps or other paper storage. The tray top position is partitioned to provide three rectangular, box-like storage sections.

The thermally insulated cups have a unique locking tab at the base of the cup, such that when rotated within the cupholder, engages a mating lip at the base of the tray cupholder to restrain the cup from tipping or bouncing out of the tray. The cups can be made from a durable plastic or stainless steel and are thermally insulated to retain heat.

The telescoping stand can be adjusted vertically by loosening a threaded circular clamp that grips a circular inner elongate tube and circular outer elongate tube, and then raising or lowering the inner tube and tray. The stand has a swivel at the top so that the tray may be rotated in the horizontal plane.

The horizontal adjustment means consists of a swivel attached to a tray base portion, a square inner bracket attached to the swivel, and a mating square outer bracket slidably engaging the inner bracket, A snap pin is inserted in one of a plurality of vertical apertures in the inner and outer brackets to fix the position of the inner bracket. The adjustable brackets allow horizontal location adjustment of the tray away from or over the vertical stand. Thus, the tray is three-dimensionally adjustable within the limits of the tube lengths and the bracket lengths.

It is thus the object of the apparatus of the invention to provide an adjustable cup-warming tray that can store objects and documents within easy reach of a vehicle operator and to permit use of same at night.

Other objects, advantages, and capabilities of the present invention will become more apparent as the description proceeds.

BRIEF DESCRIPTION OF THE DRAWINGS

FIG. 2 is a side elevation view of the truck tray of the invention

FIG. 3 is a front elevation of the truck tray of the invention;

FIG. 4 is a perspective view of the truck tray and stand of the invention;

DETAILED DESCRIPTION OF THE INVENTION

Figure 5:
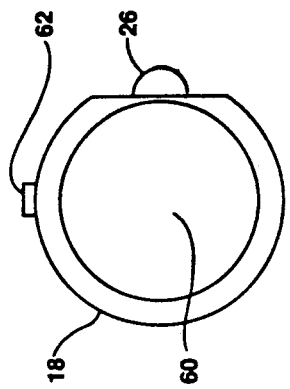
FIG. 5 is a front elevation of a cup of the present invention.

A truck tray apparatus, cupholder, an cup constructed in accordance with the present invention is illustrated in FIGS. 1-6. The tray apparatus 10 (FIG. 1) generally stated includes a tray 12, a stand 14, a horizontally adjustable attachment means 16, and an interlocking cup 18. The depressions or cupholders 20 are heated by heaters within the tray, and there is an internal light (not visible) that illuminates the cupholder area.

Referring now to FIGS. 2-4, the cupholders 20 are heated by operation of switch 22. A unique feature of the cupholder is a lip 24 that retains cup 18 until the cup is rotated to disengage a tab 26 (FIG. 6) at a bottom portion of cup 18.

The tray 12 also has box-like storage sections 28 in a top portion of the tray and a map drawer 30 in the front position of the tray. Adjacent the drawer is another electrical switch that energizes light 34 (shown in phantom lines) within the tray providing low-level illumination of the cups through the plastic tray.

The horizontally adjustable attachment means 16 is shown in FIG. 3 and consists of a first swivel 40, an inner bracket 42 having a plurality of apertures, and an outer bracket 44 slidably engaging the inner bracket also having a plurality of apertures 46. The inner and outer brackets are affixed by snap pin 48. A second swivel 50 rotatably engages the upper portion of telescoping stand 14.

Figure 7:
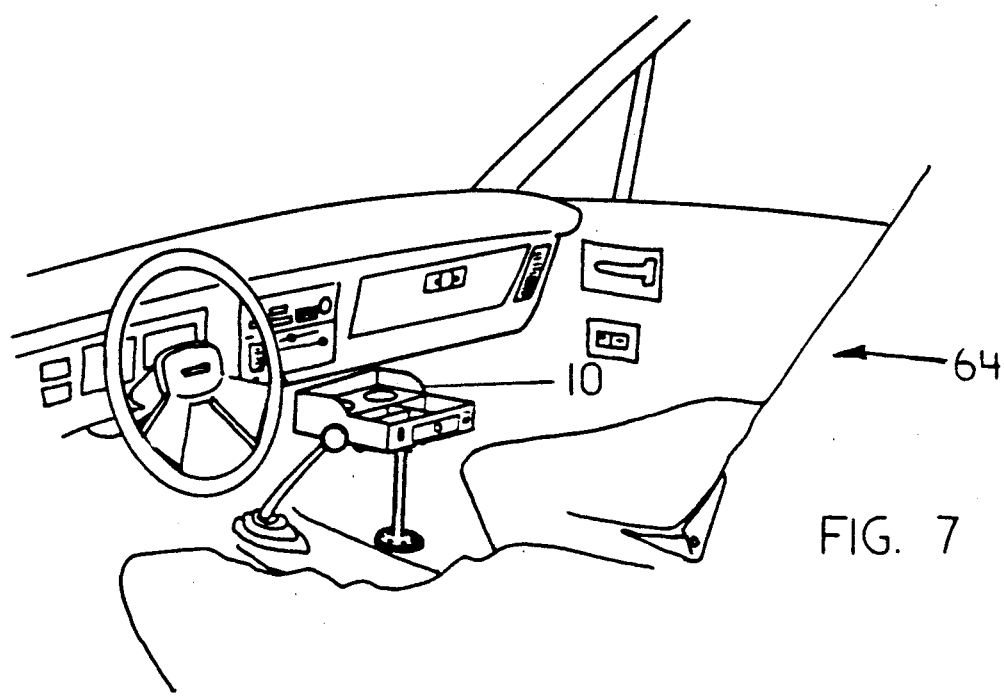
FIG. 7 is a partial perspective view of the present invention in a truck cab.
Figure 8:
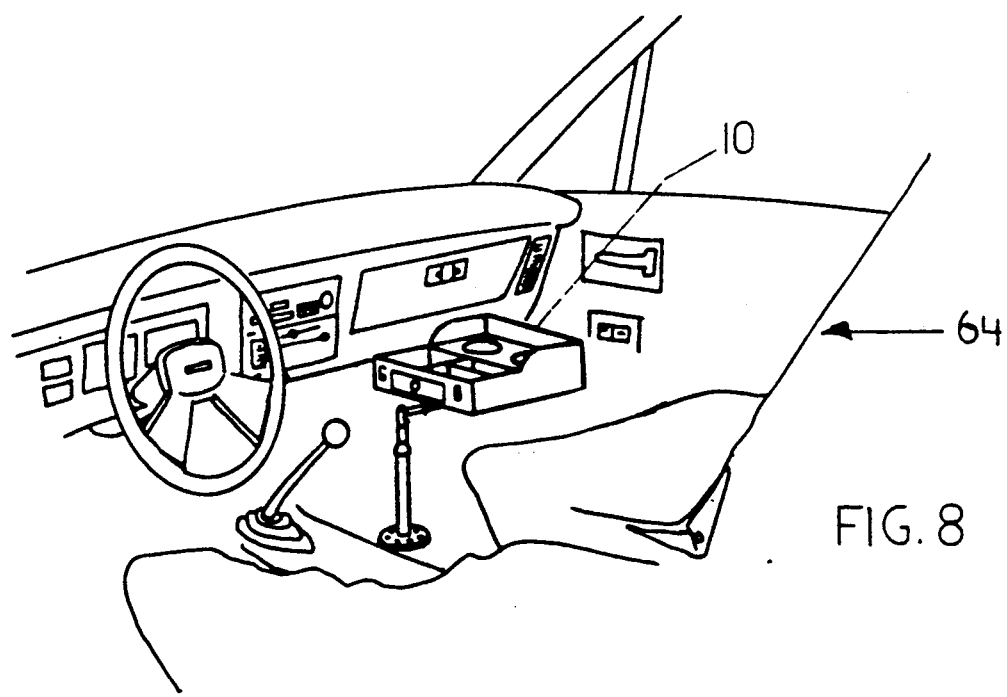
FIG. 8 is a partial perspective view of the present invention in an extended position in the truck cab.

The stand 14 (FIGS. 1 and 3) consists of an inner elongate tube 52 in telescopic engagement within an outer elongate tube 54. The inner tube vertical extension is fixed by threaded circular clamp 56 which, when loosened, allows inner telescoping tube to be raised or lowered to suit a driver's needs. Horizontal adjustment of the horizontal adjustment means 16 is accomplished by removal of snap pin 48 and sliding the inner bracket 42 in or out of outer bracket 44 until the desired extension is obtained and then reinserting snap pin 48 in appropriate apertures 46. The base 58 affixes the stand 14 to a floor section of the truck cab (FIGS. 7 and 8). Electrical wiring to the heaters and switch are contained within the stand 14 and horizontal adjustment means 16.

Figure 6:
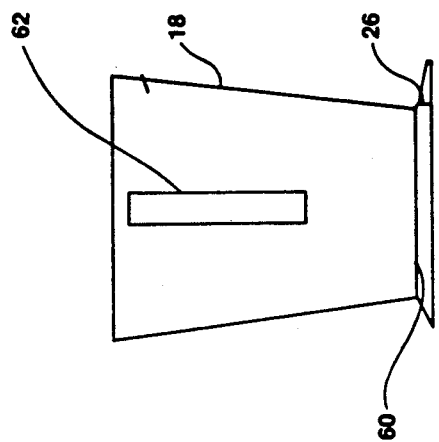
FIG. 6 is a bottom view of the cup of the present invention.
Figure 1:
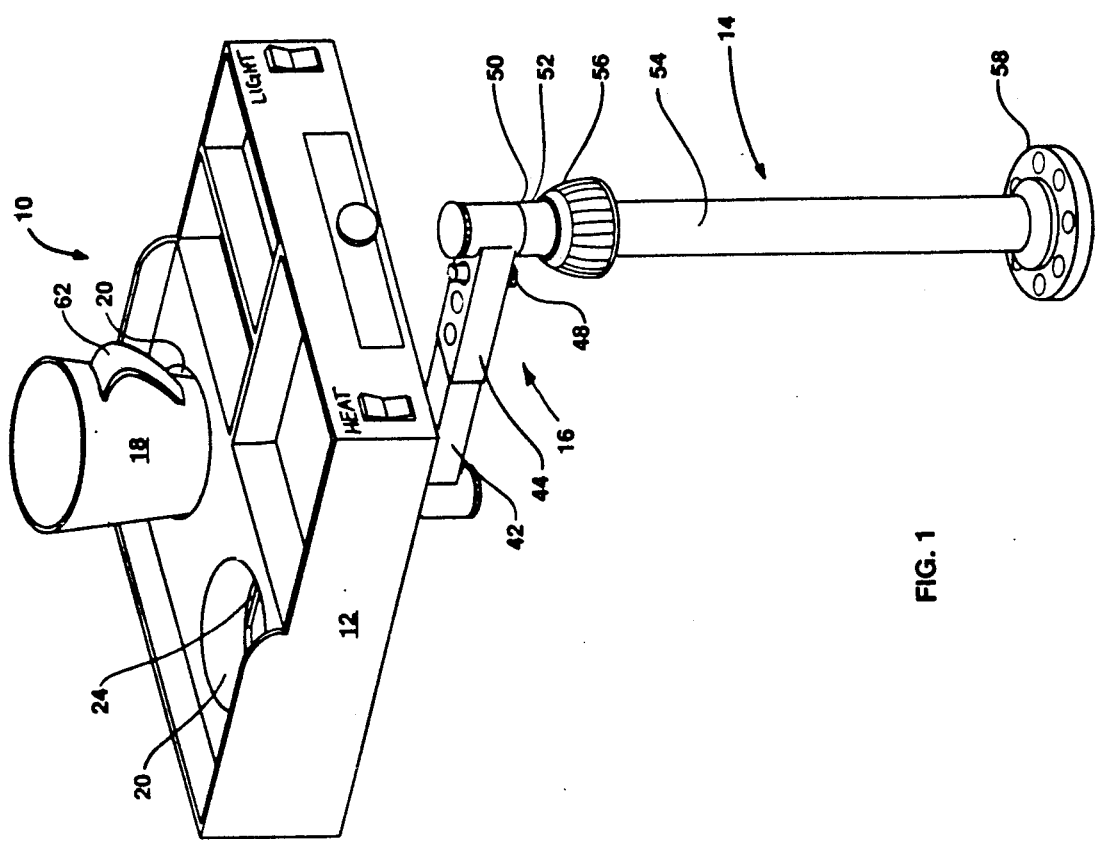
FIG. 1 is a top view of a truck tray constructed in accordance with the present invention.

The details of the tab 26 on cup 18 can be seen by referring to FIGS. 5 and 6. The insulated stainless steel cup has the tab 26 on the cup base portion 60. The tab 26 is oriented to engage the lip 24 (FIG. 2) of cupholder 20 when handle 62 is in a rearward position, as illustrated in FIGS. 1 and 3.

FIG. 7 illustrates the tray 10 in a retracted position within a truck cab 64, and FIG. 8 illustrates the tray 10 in a partially raised, rotated, and extended position.

It is apparent from the foregoing that a handy and adjustable tray has been provided allowing drivers to keep coffee warm without spilling and to reach for maps, keys, change, or papers without sacrificing safety since all items are within easy reach. Additionally, low-intensity illumination is provided by the internal light for nighttime use.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A truck utility tray comprising:
    a vertically telescoping stand attached to a truck floor;
    a horizontally adjustable attachment means affixed to a top portion of the stand;
    a rotatable swivel affixed to the horizontally adjustable attachment means;
    a tray base portion attached to the swivel;
    one or more depressions within a top portion of the tray for holding a cup;
    a plurality of box-like open storage sections in the top portion of the tray; and
    electric switch means on the front portion of the tray for activating heaters below the cups and for energizing a built-in light within the tray; the cups having interlocking means to retain said cups within the tray depressions.

2. The tray as recited in claim 1 and wherein there are two cup depressions.

3. The tray as recited in claim 1 and wherein there are three storage sections in the tray.

4. The tray as recited in claim 1 and wherein there is a drawer in a front portion of the tray.

5. The tray as recited in claim 1 and wherein the tray is made from plastic such that the light illuminates the cups.

6. The tray as recited in claim 1 and wherein the cup interlocking means consists of a tab extending out from a cup base portion that engages a lip at a bottom portion of the tray depression until the cup is rotated to disengage the tab from the lip.

7. The tray as recited in claim 6 and wherein the cup is a thermally insulated stainless steel cup.

8. The tray as recited in claim 1 and wherein the horizontally adjustable attachment means further comprises:
    an outer bracket having a plurality of vertical apertures in the bracket;
    an inner bracket having a plurality of apertures slidably engaging the inner bracket; and
    a disengageable pin securing the inner bracket within the outer bracket.

9. The tray as recited in claim 1 and wherein the telescoping stand further comprises:
    a stand with a plurality of bolt apertures for mounting on the truck floor;
    an outer elongate tube attached to the base;
    an inner elongate tube in telescopic engagement with the outer tube;
    a threaded circular clamp that grips the inner tube in a fixed position within the outer tube; and
    a second swivel mounted at a top end of the inner tube that allows rotation of the horizontally adjustable attachment means and the tray.

* * * * *